Sept. 7, 1965 R. WEINGER 3,204,967

RECORD MACHINE

Filed Oct. 25, 1960 2 Sheets-Sheet 1

INVENTOR

Ralph Weinger,

BY Pais, Haskell & Levine,

ATTORNEYS

INVENTOR
Ralph Weinger,
BY Paris, Haskell & Levine
ATTORNEYS 3,204,967
Patented Sept. 7, 1965

3,204,967

RECORD MACHINE

Ralph Weinger, Philadelphia, Pa., assignor to Jetronic Industries, Inc., a corporation of Pennsylvania Filed Oct. 25, 1960, Ser. No. 64,763
19 Claims. (Cl. 274—4)

The present invention relates generally to record machines, and particularly to the mechanical structure of machines for recording on and/or playback from cards or sheets adapted to store information or intelligence thereon. It is presently contemplated that this invention will find its area of primary use in the field of magnetic recording and/or playback, wherein the recording is made on magnetic flux susceptible cards or sheets. Accordingly, the present invention is described herein with particular reference to magnetic record machines, although it is not intended thereby to limit the invention to the magnetic medium of information storage. As used herein the term "record machine" encompasses machines adapted to record on an information storage medium, as well as machines adapted to play back recordings made on such a medium, and machines adapted to perform both operations.

With reference to record machines utilizing a magnetic information storage medium, the primary development has been in what is generally termed tape machines, i.e., machines adapted to feed on indefinite length of magnetic tape or wire from a playout spool to a take-up spool, wherein the tape passes a suitable magnetic recording or playback head in its traverse from one spool to the other. Such machines have proved eminently satisfactory for handling long messages. But for short messages, these machines are undesirable because of the expense and storage problems entailed in stocking and handling numerous spools of short lengths of tape. Alternatively, when numerous short messages are recorded on one long length of tape, the problem of indexing and locating desired messages therefrom can be quite laborious and time consuming.

Since much business, office, and other commercial correspondence and memoranda comprise relatively short messages, and since in many instances such correspondence and memoranda may serve their function by being retained in their magnetically recorded form without being transcribed, there is a substantial need for magnetic recording on relatively small flat rectangular cards or sheets, which per se can be conveniently handled, stored, transmitted, and mailed directly, by means and facilities currently used for storing and transmitting the transcribed messages as typed sheets of paper.

Also, in the area of musical recordings many of the same considerations apply. As a result, magnetic recording of contemporary tunes and songs and other short selections has failed to evolve as a commercial factor because of the undesirability of putting short selections on tape.

The need for a magnetic record machine adapted to operate on and/or from a small flat rectangular magnetic record has been recognized, and efforts have been made to develop such machines. However, these efforts have failed to evolve a simple, efficient, effective, and reliable machine for these purposes. The basic problem in this dechine for these purposes. The basic problem in this development is one of registration. Obviously, to be meaningful, magnetic recording on a flat sheet or card must be on a line-by-line basis; that is, provision must be made for recording successive lines of information on the sheet or card. This entails relative movement between the card and recording head along two dimensions of the card. Since magnetic recordings do not leave a visible mark to facilitate registration of the recorded lines with the playback pick-up, or a groove to facilitate tracking by a playback head, the problem of obtaining and maintaining an indexed relation between the magnetic card and a recording or playback head is a difficult one. This is particularly true when one considers that to be of significance, a recorded card must be able to be registered or indexed at a later time with the playback head of not only the machine on which the record was made, but also on other machines perhaps remote from the originator of the recorded message or other intelligence.

Prior efforts to solve this registration problem have involved such approaches as: providing means for fine adjustment of the recorded card, so that the listener can aurally find the proper registration position; providing intricate and complex positioning and feed mechanisms; and providing grooved or otherwise mechanically indexed magnetic records. The first approach presents an undesirable burden and inconvenience on the user, while the second approach, of course, results in an expensive machine requiring careful and expensive maintenance, and the third approach results in an expensive record and/or special modification of the magnetic recording techniques.

In accordance with the present invention, a very simple approach and mechanism is utilized for effecting a line-by-line scan or traverse of the record card or sheet, which adapts readily to very accurate automatic registration or indexing between card and recording or playback head, utilizing simple expedients that do not require difficult manufacturing tolerances or expensive maintenance service to keep the machine in prescribed registration. Accordingly, this machine can be manufactured inexpensively, and used efficiently for purposes of recording and playback of information of magnetic cards, sheets, or the like.

In general, the present magnetic record machine, comprises a card holder which includes a card receiver and a card feeder adapted to advance the card in a direction corresponding to one dimension of the card. A rotating magnetic head mount is positioned adjacent the card holder and carries a plurality of magnetic recording or pick-up heads spaced equally about a circle having as its center the axis of rotation of the head mount. The card holder and head mount are relatively oriented so that the magnetic heads successively traverse the card transversely to the direction of card feed, thereby exposing successive substantially arcuate lines across the card to the effect of the magnetic heads. Contrary to other approaches in this field, in the machine of the present invention, both the card holder and the axis of rotation of the head mount are stationary, thus permanently fixing their relative orientation. The card holder is adapted to receive the card preferably by insertion along the card feed axis, but in the opposite direction from card feed, and by simple edge guides and an insertion limit stop, provide an exact orientation of the card in the holder, and hence a precisely indexed starting position between the card and the circle of travel of the recording heads. In addition, an indexing device is associated with the head mount, so that its rotation is always started from the same relative orientation between recording heads and card holder. The card feed and head mount drives are interconnected in order to obtain a prescribed ratio of movement therebetween.

Experimentation has shown that the most critical aspect of registration is that the magnetic heads should always traverse the cards on substantially the same family of arcs. In other words, on playback the traverse made by the magnetic heads should not intersect, but rather should run parallel with, the recorded lines made during the recording operation. Exact registration between the lines of traverse of the magnetic heads during recording and during playback is otherwise not essential, and appreciable tolerance in registration can be allowed with respect to displacement on the axis card feed. Therefore, the critical factors reside in the orientation of the head mount relative to card holder, the orientation of the magnetic heads on the mount, and orientation of the head mount indexing means. In accordance with the construction of the present machine, these factors are all easily controlled and established during manufacture, and are not likely to vary during ordinary use and the life of the machine. With the present machine and its principle of operation, the only registration or indexing aspect of user operation is insertion of the record card, and this is practically self-indexing, requires only a modicum of care, and in any event is not a highly critical registration factor.

It is accordingly one object of the present invention to provide a record machine for sheet or card records, and particularly, although not exclusively, for magnetic records.

Another object of the present invention is to provide such a record machine having a simplified mechanism for line-by-line scan of the record sheet or card.

Still another object of the present invention is to provide such a record machine in which uniform registration or indexing between the recording and/or playback heads of the machine and the record is essentially automatic.

And a still further object of the present invention is to provide such a record machine in which proper and reproducible registration or indexing between the record and the recording and/or playback heads of the machine is obtained as a result of merely inserting the record into a record receiving holder until the inserted end of the record engages an abutment stop.

Other objects and advantages of the present invention will become apparent to those skilled in the art from a consideration of the following detailed description of one illustrative embodiment thereof, had in conjunction with the accompanying drawings, in which like numerals refer to the same or corresponding parts, and wherein.

Figures 1, 3:
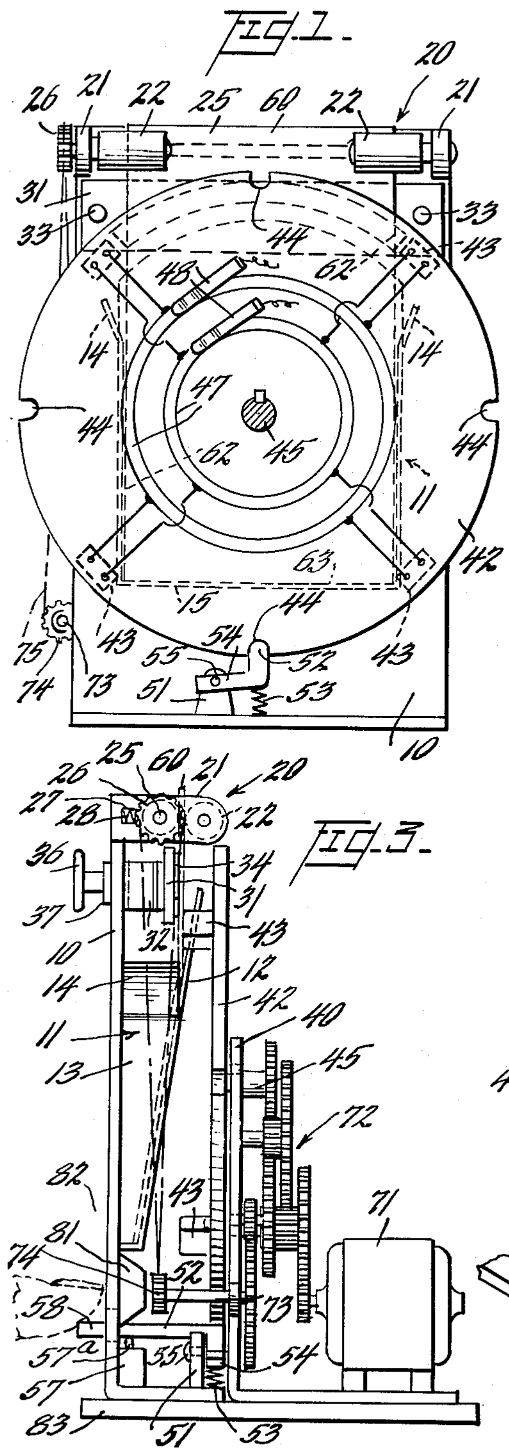
FIGS. 1 and 2 are views of a portion of a magnetic record machine illustrating the principles of operation of the present invention, and taken along the line 1—1 of FIG. 3.
FIG. 3 is a side elevation view of the mechanism of the present record machine.

Since the present invention relates to the mechanical aspects of a record machine, that is to the record receiver and feed, the recording and/or playback head assembly, and registration and indexing between the record and heads, the electronic circuits and components are not shown in the drawing. Since the electronic components and their relationships are conventional and well understood by those skilled in the art, specific reference thereto is deemed unnecessary.

It is desired first to describe the record card holder assembly, including the card guide and receiver, and the card feed mechanism. For this purpose, reference is had particularly to FIGS. 5 and 6. The record card holder assembly is mounted on frame member 10. At the top of this frame member 10 is the card feed mechanism generally designated by the numeral 20, and under it is the card guide and receiver generally designated by the numeral 11. Between the feed mechanism 20 and the receiver 11 is a resilient card backing means generally designated by the numeral 30.

The card receiver 11 is shown as a metal stamping bent to form a receiving pocket when attached to the frame 10, opening upwardly under the card feed mechanism 20. The card receiver 11 comprises the front panel 12, two side panels 13, a bottom panel 15, and two inwardly turned rear tabs 16 welded or otherwise secured to frame 10. The stamping 11 is formed so that front panel 12 slopes toward the frame 10 from top to bottom, and at the upwardly opening mouth of the card receiver the side panels 13 are formed with tabs 14 which are turned outwardly slightly from the mouth. The distance between the two side panels 13 below the outwardly turned tabs 14 is chosen to conform very closely to the transverse dimension of a record card, such as a magnetically susceptible record card, intended to be inserted into the receiver 11 from above its upwardly opening mouth. Thus, the outwardly turned tabs 14 facilitate and guide the insertion of the record card. The sloping front panel 12 also guides the card as it is inserted, deflecting and directing its bottom edge to the bottom panel 15, which provides an abutment stop for the inserted card. Thus, the two sides 13 and bottom 15 of the card receiver 11 accurately define a specific location and orientation for the inserted card.

A record card is inserted into the card receiver 11 through the feed mechanism 20 located at the top of frame 10. The top of frame 10 is formed with a pair of forwardly projecting arms 21, one at each side of the frame. These arms mount a pair of drive rollers 23 each provided with a friction surface 24, such as rubber. Rollers 23 are keyed onto shaft 25 for unison rotation, and the shaft 25 is journaled in elongate slots 27 formed in the frame projections or arms 21. A pair of idler rollers 22 are also mounted on arms 21 in opposed relation to the rollers 23. Housed and captured in each slot 27 is a spring 28 bearing against the shaft 25, and hence resiliently urging drive rollers 23 against the opposed idler rollers 22. A drive sprocket 26 is affixed to an end of shaft 25 for rotationally driving the shaft and rollers 23, as will be subsequently described.

As thus far described, a record card is inserted into the card holder assembly by pushing an end of the card between the drive rollers 23 and the idler rollers 22, causing the drive roller assembly to move rearwardly against the springs 28 and permitting the card to pass between the two sets of rollers and move downwardly into the mouth of the card receiver 11. As the leading end of the card enters the mouth of receiver 11, it is squared up to correct any misalignment by engagement with the outwardly turned tabs 14, and is deflected into the receiver and directed to the bottom thereof by the sloping front panel 12. When the leading or bottom end of the card abuts the bottom wall 15 of the receiver 11, its location and orientation is substantially precisely defined by the confining walls of the receiver. The top portion of the card remains in the feed mechanism with its side margins in engagement with and between the feed rollers 23 and idler rollers 22.

As will be subsequently more fully described, the recording and playback will be effected on and from the card in the area between the feed mechanism 20 and the card receiver 11. In order to obtain good magnetic coupling between the card and the magnetic heads in the instant magnetic record machine, it is desirable to provide a resilient backing behind the card in the area where the card is traversed by the magnetic heads. A resilient backing assembly for the card is, therefore, provided between the card feed mechanism 20 and the card receiver 11, and is generally denoted by the numeral 30. It comprises the backing plate 31 resiliently supported by the bowed leaf spring 32. The ends of the spring 32 are affixed to the ends of the plate 31 by rivets 33, or the like, and the center of the spring is anchored to the frame 10 by eyelet 37. An arcuate strip of felt or similar soft material 34 is affixed across the front surface of the plate 31, defining the general area traversed by the record machine's magnetic heads, as will be later more fully described. The backing assembly 30 when uncompressed is designed to protrude forward of the feed rollers 23, in order to afford a backing pressure on the record card portion depending from the feed mechanism. Therefore, in order to facilitate the insertion of a card from the feed mechanism 20 into the card holder 11, a pull rod 35 is provided, having one end passing through the backing plate 31 and being there peened over, and the other end passing through the eyelet 37, and carrying a shouldered knob 36. Thus, by pulling on knob 36, the plate 31 can be retracted toward the frame 10 against the resilient force of spring 32, to clear the backing plate assembly from the path of feed of a record card being inserted through the feed mechanism 20 into the card receiver 11. After a record card has been fully located in the machine, the knob 36 is released, enabling the plate 31 and its arcuate strip 34 to bear against the back side of the inserted record card. In a manner that will be apparent to one skilled in the art, the pull rod 35 could also be connected to drive roller shaft 25, to retract this roller assembly during insertion of a record card, and thereby facilitate this operation.

Figures 2, 4:
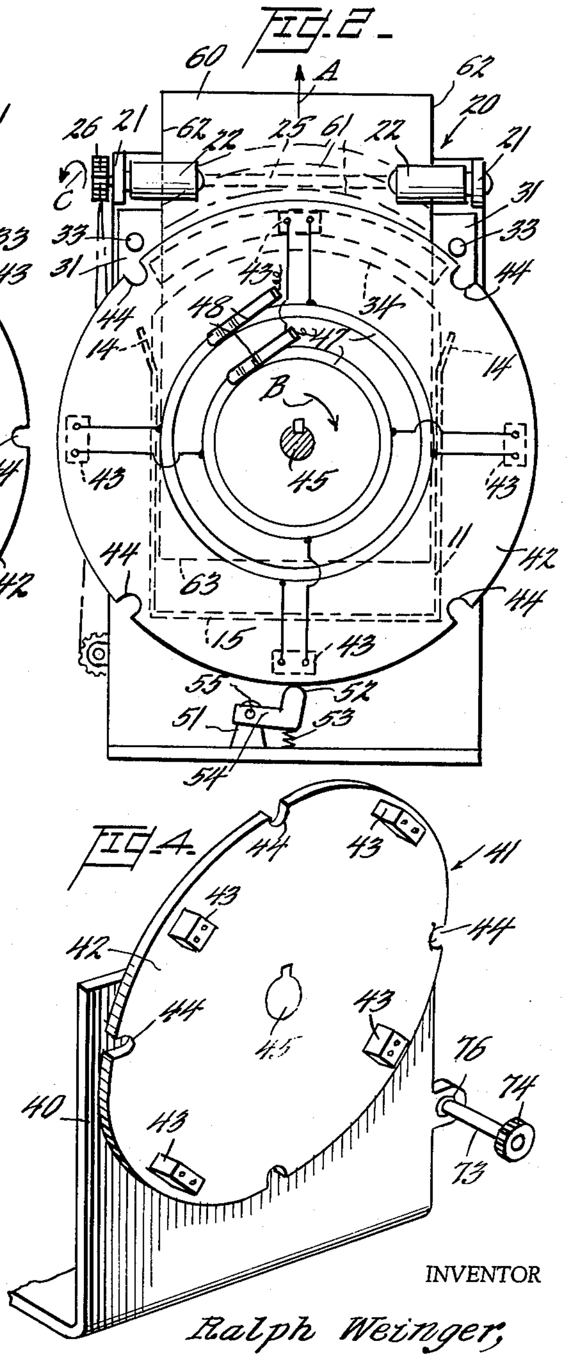
FIG. 4 is a perspective view of the magnetic head mount of the record machine shown in FIG. 3.

The recording and/or playback head assembly 41 is best shown in FIG. 4. It comprises four magnetic recording and/or playback heads 43 fixedly mounted on disc 42. The disc is in turn mounted on shaft 45 which is rotationally journaled in frame member 40. As previously indicated, the orientation and indexing of the magnetic heads 43 relative to the orientation of a record card fully inserted in card receiver 11, is a critical and a most important factor in obtaining reproducible registration between the magnetic heads and the lines of recording applied to the record card. Accordingly, first the magnetic heads 43 are all mounted at the same radial distance from the center of rotation of the disc 42, and second, all angles of separation between adjacent heads, from the center of rotation of disc 42, are equal. Thus the heads 43 are arranged symmetrically about the axis of rotation of the mounting disc 42. For reasons that will subsequently become apparent, the straight line separation between adjacent heads 43 should preferably be approximately equal to the width of the record card used.

Midway between each adjacent pair of magnetic heads, and thus symmetrically arranged about the disc axis of rotation and relative to the recording heads, the disc 42 is provided with indexing notches 44. Notches 44 are for the purpose of insuring that recording or playback always starts with the disc 42 in a specified rotational orientation relative to the indexed record card.

Figures 5, 6:
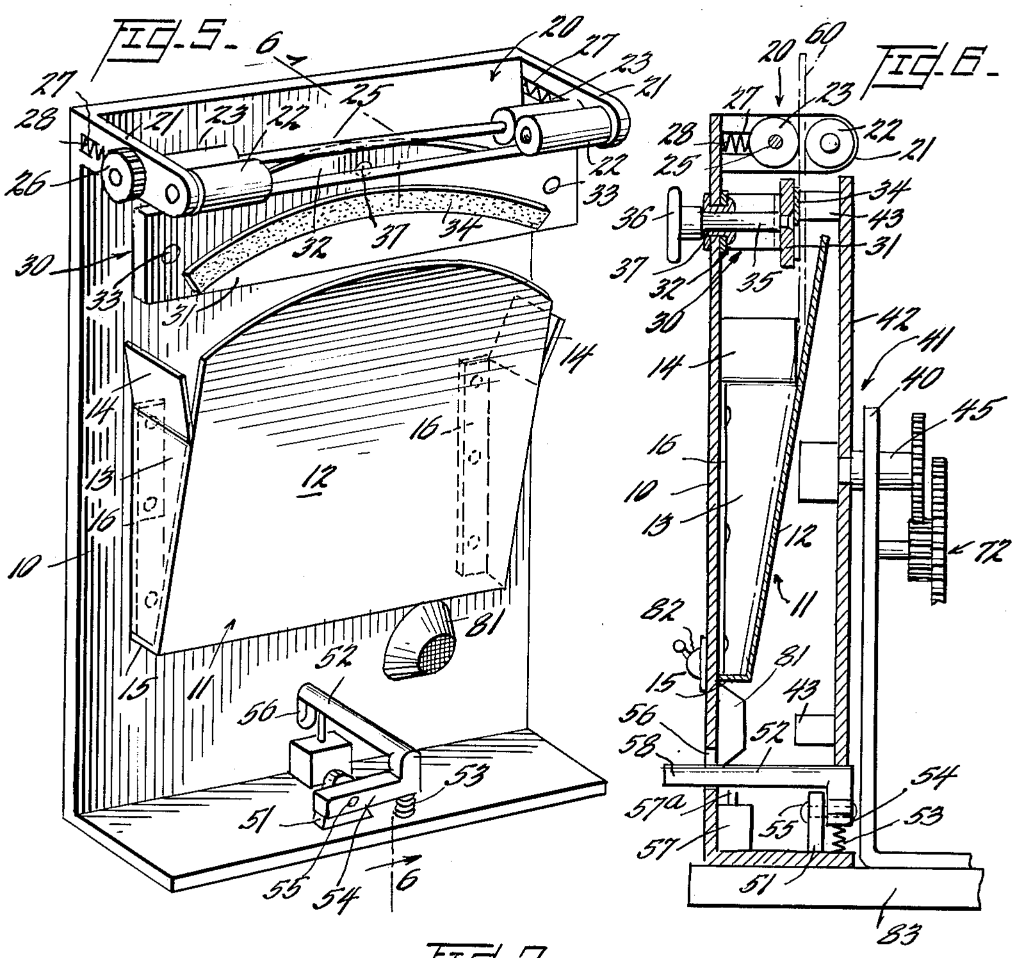
FIG. 5 is a perspective view of the card holder, including the card receiver and card feed mechanism, of the record machine shown in FIG. 3.
FIG. 6 is a vertical sectional view taken along the line 6—6 of FIG. 5.
Figure 7:
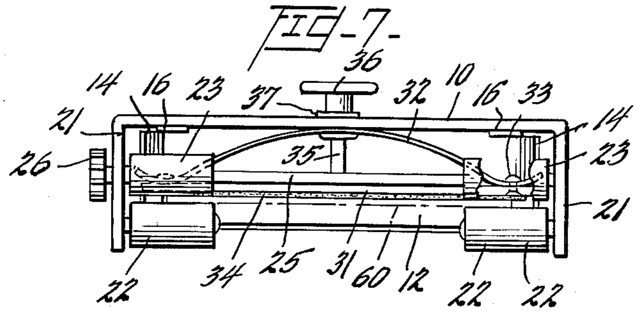
FIG. 7 is a top plan view of the card holder assembly shown in FIGS. 5 and 6.

Referring to FIGS. 3, 5, and 6, it will be seen that the frame member 10 carries a stop bar 52 pivotally mounted at 55 on upturned ear 51 by means of arm 54. Stop bar 52 is urged upwardly about its pivot 55 by spring 53, and it is elongate, extending through slot 56 in frame 10 with a projecting operating tab 58. When frame members 10 and 40 are properly located and mounted on base 83, as shown in FIG. 3, the force of spring 53 normally projects stop bar 52 against the periphery of disc 42, causing the bar to enter an indexing notch 44 when one registers with the stop bar. This relationship defines an indexed position of the magnetic heads relative to the card receiver. Since the four magnetic heads 43 are symmetrically arranged about the axis of rotation of disc 42, all four indexing notches 44 are equivalent for indexing purposes.

The assembly of frame 10 and its associated card feeding mechanism, card receiver, and card backing plate, with frame 40 and its associated magnetic head mount, is shown in FIG. 3. These two frames are mounted in a prescribed relative orientation on base 83, with the axis of rotation of the magnetic head mounting disc 42 midway between the two side panels 13 of the card receiver 11 and at a prescribed vertical position relative to the bottom panel 15 of said card receiver, and with the magnetic heads 43 projecting toward the frame 10, so as to traverse the area of arcuate card backing strip 34 when disc 42 is rotated. In FIG. 3, the stop bar 52 is shown as depressed against the force of spring 53, as may be conveniently accomplished by an operator applying a downward finger pressure on projecting tab 58 of bar 52. This leaves disc 42 free to rotate.

Further shown in FIG. 3 is a constant speed motor 71, which operates through a suitable reduction gear drive 72 to rotate the magnetic head mounting disc 42 through shaft 45. Similarly, the reduction gear drive rotates shaft 73, journaled in and projecting through frame 40 at 76, to rotate sprocket 74. Chain drive 75 connects sprocket 74 with card feed drive sprocket 26. A switch 57 actuated by plunger 57*a* is located under stop bar 52, and controls the energization of motor 71. Switch 57 is designed to be closed, and thus energize motor 71, when stop bar 52 is depressed, and to open only when the stop bar has been elevated up into one of the indexing notches 44 in disc 42.

Thus, when an operator depresses tab 58, thereby lowering stop bar 52 out of an indexing notch 44 and closing switch 57, motor 71 is energized to drive both the magnetic head mounting disc and the card feed mechanism at prescribed relative speeds controlled by the gearing therebetween. This drive continues as long as tab 58 and bar 52 are depressed. On release of tab 58, spring 53 forces stop bar 52 up into engagement with the periphery of disc 42. However, switch 57 remains closed and motor 71 remains energized until a notch 44 moves into registry with bar 52, allowing the bar to move up into the notch. Only then is switch 57 opened and motor 71 de-energized, causing the disc 42 and its magnetic heads 43 to stop at an indexed position. Thus, the magnetic head assembly always comes to rest and always starts from a prescribed orientation relative to the card receiver 11.

Also indicated in FIG. 6 as mounted on frame 10 is a switch 82 for energizing the usual electronic circuits of a recorder, such as the power supply, amplifier, etc. This switch may, of course, have three positions: off, record, and playback. A speaker-microphone indicated at 81 may also conveniently be mounted on frame 10.

Referring now particularly to FIGS. 1 and 2, the operation of the present magnetic card recorder will be described. FIG. 1 indicates the starting condition of the machine. A card 60, having a magnetic recording ferrite coating is inserted in the machine by having one end 63 forced between the feed drive rollers 23 and idler rollers 22 (FIG. 5), past the retracted backing plate assembly 30 (see FIG. 5, not shown in FIGS. 1 and 2), and into the card receiver 11. On entering the mouth of the card receiver, the inserted end 63 of the card 60 is guided laterally by the turned out tabs 14 into alignment with the two side panels 13 of the receiver. These side panels are spaced apart a distance substantially equal to the width of card 60. The card is then deflected and directed by the front panel 12 toward the bottom panel 15 of the receiver 11. When, as shown in FIG. 1, the bottom edge 63 of the card 60 reaches the bottom panel 15 as an abutment stop, the side edges 62 of the card are aligned with and engage the side panels 13 of the card receiver 11, and the card is in its indexed position ready for recording or playback. As further shown in FIG. 1, the magnetic head assembly is in an indexed position by the entry of stop bar 52 in an indexing notch 44.

When stop bar 52 is depressed out of notch 44, the motor 71 (FIG. 3) is energized causing disc 42 to rotate, card feed sprocket 26 to rotate, and card 60 to advance upwardly, as indicated by arrows B, C, and A, respectively, as shown in FIG. 2. In its advancing feed movement upwardly, card 60 is retained in its indexed alignment by the guiding side panels 13 of receiver 11.

As card 60 advances and disc 42 rotates, the card is traversed by the magnetic heads 43 successively in successive arcs 61 against the back pressure of the resilient card backing assembly 30. Having started from the indexed condition of FIG. 1, the same arcs 61 will always be traversed by heads 43, whenever the card 60 is again started from an indexed condition of the machine, whether in the same machine, or any other similar machine properly aligned in manufacture. Thus, a card 60 having been used to record a message, can be played back at any time, and during playback the traverses of the heads 43 across the card will always register with the lines traversed during recording. Of course, during operation the position of the card should not be manually altered, otherwise the indexed relation of the card and magnetic heads will be lost. Operation may, however, be interrupted at any time by inactivation of the card and head drive, as by releasing stop bar tab 58.

Multiple magnetic heads 43 are employed in order that recording and/or playback may be continuous; that is, as one head completes its traverse of the card, the succeeding head commences the next traverse. Accordingly, the spacing between adjacent heads is chosen to approximate the lateral width of the card. If desired, the succeeding head may commence its traverse first before the preceding head completes its traverse. Therefore, as indicated in FIGS. 1 and 2, all the heads 43 may be energized in parallel, as is conveniently accomplished by a pair of conductive rings 47 applied to the surface of disc 42 (disc 42 being preferably molded from a non-conductive plastic) connected to each of the heads 43, and energized by sliding contact fingers 48. Although four magnetic heads 43 are shown in the drawings, obviously more or less heads can be employed, as desired.

The foregoing specific form of magnetic recorder is presented merely by way of example, as illustrative of the present invention. Obviously, many modifications and alternatives will be apparent to those skilled in the art. For example, the medium of recording is not necessarily limited to magnetics. The motor drive can be directly mechanically clutched in and out to start and stop the recording operation, rather than utilizing electrical energization and deenergization of the motor and indirect braking therefor. Also, if a mechanical clutch is used, a fly wheel can be associated with the motor for smoother operation. By using a segmented commutator in parallel with a manual control switch for energization and deenergization of the motor to control operation, the segmentation of the commutator can be used for indexing control of the rotating magnetic head assembly, and this, of course, can be combined with a mechanical clutch for the drive, if desired. Pulley drives can, of course, be used instead of the gear drives indicated. A housing would normally be provided over the mechanism shown in the drawings, and elements 36, 81, and 82 could be applied thereto rather than to frame member 10, or frame member 10 could be a part of such housing. And in general, alternative specific forms of the several elements and components of the present machine will readily suggest themselves to those skilled in the art. Accordingly, it is not intended that the present invention be considered as limited to the specific form shown, and such changes, modifications, and alterations as are embraced by the spirit and scope of the appended claims are contemplated as within the purview of the present invention.

What is claimed is:

1. A magnetic record machine for operation with rectangular magnetic record sheets, comprising: a record receiver including means for indexing a rectangular record sheet in a prescribed orientation and position along two transverse dimensions thereof relative to said receiver; a record feed mechanism including means for advancing a record out of said receiver; a magnetic head assembly including a mount, means carrying said mount for rotational movement about an axis, and a magnetic head affixed to said mount and spaced from said axis; means for indexing the angular position of said head in a prescribed orientation relative to said axis; means for fixedly mounting said receiver and magnetic head assembly relative to each other locating said axis in a fixed prescribed orientation relative to said card indexing means, said head assembly being mounted with said head directed toward said receiver and in position to traverse a record sheet on rotation of said mount about said axis as a record sheet is fed out of said receiver by said feed mechanism, with the direction of traverse being transverse to the direction of feed of said card; and means for rotating said mount about said axis and driving said feed mechanism at a prescribed ratio of rate of angular rotation of said mount to rate of advance of a record by said feed mechanism.

2. A magnetic record machine as set forth in claim 1, wherein said head indexing means includes means for automatically bringing said head into said prescribed orientation relative to said axis.

3. A magnetic record machine for operation with flat magnetic records, comprising: a record holder including means for locating a flat record in a prescribed orientation and position relative to said holder, and for advancing a record thus located along a prescribed line of travel; a magnetic head assembly including a magnetic head, and a head mounting means for moving said head in a prescribed closed circuit path; means for indexing the position of said head in a prescribed orientation along said path so as to locate said head in a prescribed orientation relative to said holder; means for fixedly mounting said holder and head assembly relative to each other locating said head mounting means in a prescribed orientation relative to said record locating means, and in position for said head to traverse a record on cyclical movement of said head along said path as a record is advanced along said prescribed line of travel, said traverse being transverse to said line of travel; and means for driving said mount and said record advancing means at a prescribed ratio of rate of head movement to rate of record advance.

4. A magnetic record machine as set forth in claim 3, wherein said head indexing means includes means for automatically bringing said head into said prescribed orientation along said path.

5. A magnetic record machine for operation with magnetic record cards, comprising: a record receiver having two side walls and an end wall and being open at its other end, whereby a magnetic record card can be inserted in and withdraw from said receiver through said open end, said end wall defining an abutment stop for the end of a record inserted through said open end and said two side walls being guides whereby to index an inserted record card in a prescribed position and orientation relative to said receiver; feed means for advancing an inserted record card out of said receiver through said open end and along a prescribed line of travel; a magnetic head assembly including a magnetic head, and a head mounting means for moving said head in a prescribed closed circuit path; means for indexing the position of said head in a prescribed orientation along said path; means for fixedly mounting said receiver and head assembly relative to each other locating said head mounting means in a prescribed orientation relative to said receiver, and in position for said head to traverse a record card on cyclical movement of said head along said path as a record card is advanced along said prescribed line of travel, said traverse being transverse to said line of travel; and means for driving said mount and said record card feed means at a prescribed ratio of rate of head movement to rate of record card advance.

6. A magnetic record machine as set forth in claim 5, wherein said head indexing means includes means for automatically bringing said head into said prescribed orientation along said path.

7. A magnetic record machine for operation with magnetic record cards, comprising: an open ended record receiving compartment including means for indexing a record card inserted through said open end into a prescribed position and orientation relative to said compartment; feed means for advancing an inserted card out of said compartment through said open end and along a prescribed line of travel; a magnetic head assembly including a magnetic head, and a head mounting means for moving said head in prescribed closed circuit path; means for indexing the position of said head in a prescribed orientation along said path; means for fixedly mounting said compartment and head assembly relative to each other locating said head mounting means in a prescribed orientation relative to said record card indexing means, and in position for said head to traverse a record card on cyclical movement of said head along said path as a record card is advanced along said prescribed line of travel, said traverse being transverse to said line of travel; and means for driving said mount and said record card feed means at a prescribed ratio of rate of head movement to rate of record card advance.

8. A magnetic record machine as set forth in claim 7, wherein said head indexing means includes means for automatically bringing said head into said prescribed orientation along said path.

9. In a magnetic record machine of the type having a magnetic head assembly including a plurality of magnetic heads symmetrically located about and equidistantly spaced from the axis of rotation of a rotationally carried head mount, wherein the heads are adapted successively to traverse a magnetic record sheet in successive spaced parallel passes across the face of the record sheet; the improvement comprising: an open ended record receiving compartment adapted to receive a magnetic record sheet through said open end and including therein means for indexing a record sheet inserted through said open end into a prescribed position and orientation relative to said compartment; feed means for advancing an inserted sheet out of said compartment through said open end along a prescribed line of travel; means for fixedly mounting said compartment and head assembly relative to each other locating aid axis of rotation of said head mount in a fixed prescribed orientation relative to said sheet indexing means, and in position for said heads to effect said successive passes over said record sheet as it is advanced along said prescribed line of travel, said passes being transverse to said line of travel; means for indexing the angular position of said mount about said axis to obtain a prescribed orientation of said heads relative to said sheet indexing means; and means for rotationally driving said mount and driving said record sheet feed means at a prescribed ratio of angular rotation of said mount to rate of advance of a record along said line of travel.

10. In a magnetic record machine as set forth in claim 9, said head mount indexing means including means for automatically bringing said heads into said prescribed orientation relative to said sheet indexing means.

11. In a magnetic record machine as set forth in claim 9, said record sheet indexing means comprising a sheet insertion abutment stop and side guides for locating an inserted record sheet transversely of the line of insertion into said compartment.

12. In a magnetic record machine as set forth in claim 9, said record sheet feed means being located outside said compartment and spaced from said open end thereof, and said passes of said heads over a record sheet being effected in the area between said sheet feed means and said open end of said compartment.

13. In a magnetic record machine as set forth in claim 12, resilient backing pad for a record sheet located in opposed relation to said heads in said area.

14. A record machine for operation with rectangular record sheets, comprising: a record receiver including means for indexing a rectangular record sheet in a prescribed orientation and position along two transverse dimensions thereof relative to said receiver; a record feed mechanism including means for advancing a record out of said receiver; a transducer head assembly including a mount, means carrying said mount for rotational movement about an axis, and a transducer head affixed to said mount and spaced from said axis; means for indexing the angular position of said head in a prescribed orientation relative to said axis; means for fixedly mounting said receiver and transducer head assembly relative to each other locating said axis in a fixed prescribed orientation relative to said card indexing means, said head assembly being mounted with said head directed toward said receiver and in position to traverse a record sheet on rotation of said mount about said axis as a record sheet is fed out of said receiver by said feed mechanism, with the direction of traverse being transverse to the direction of feed of said card; and means for rotating said mount about said axis and driving said feed mechanism at a prescribed ratio of rate of angular rotation of said mount to rate of advance of a record by said feed mechanism.

15. A record machine for operation with sheet records, comprising: a record holder including means for locating a sheet record in a prescribed orientation and position relative to said holder, and for advancing a record thus located along a prescribed line of travel; a transducer head assembly including a transducer head, and a head mounting means for moving said head in a prescribed closed circuit path; means for indexing the position of said head in a prescribed orientation along said path so as to locate said head in a prescribed orientation relative to said holder; means for fixedly mounting said holder and head assembly relative to each other locating said head mounting means in a prescribed orientation relative to said record locating means, and in position for said head to traverse a record on cyclical movement of said head along said path as a record is advanced along said prescribed line of travel, said traverse being transverse to said line of travel; and means for driving said mount and said record advancing means at a prescribed ratio of rate of head movement to rate of record advance.

16. A record machine for operation with record cards, comprising: an open ended record receiving compartment including means for indexing a record card inserted through said open end into a prescribed position and orientation relative to said compartment; feed means for advancing an inserted card out of said compartment through said open end and along a prescribed line of travel; a transducer head assembly including a transducer head, and a head mounting means for moving said head in prescribed closed circuit path; means for indexing the position of said head in a prescribed orientation along said path; means for fixedly mounting said compartment and head assembly relative to each other locating said head mounting means in a prescribed orientation relative to said record card indexing means, and in position for said head to traverse a record card on cyclical movement of said head along said path as a record card is advanced along said prescribed line of travel, said traverse being transverse to said line of travel; and means for driving said mount and said record card feed means at a prescribed ratio of rate of head movement to rate of record card advance.

17. In a record machine of the type having a transducer head assembly including a plurality of transducer heads symmetrically located about and equidistantly spaced from the axis of rotation of a rotationally carried head mount, wherein the heads are adapted successively to traverse a record sheet in successive spaced parallel passes across the face of the record sheet; the improvement comprising: an open ended record receiving compartment adapted to receive a record sheet through said open end and including therein means for indexing a record sheet inserted through said open end into a prescribed position and orientation relative to said compartment; feed means for advancing an inserted sheet out of said compartment through said open end along a prescribed line of travel; means for fixedly mounting said compartment and head assembly relative to each other locating said axis of rotation of said head mount in a fixed prescribed orientation relative to said sheet indexing means, and in position for said heads to effect said successive passes over said record sheet as it is advanced along said prescribed line of travel, said passes being transverse to said line of travel; means for indexing the angular position of said mount about said axis to obtain a prescribed orientation of said heads relative to said sheet indexing means; and means for rotationally driving said mount and driving said record sheet feed means at a prescribed ratio of angular rotation of said mount to rate of advance of a record along said line of travel.

18. A record machine for operation with sheet records, comprising:

- a record holder including means for locating a sheet record in a prescribed orientation and position on two transverse dimensions of the record relative to said holder, said two transverse dimensions being in a single plane of the record, and for advancing a located record along a prescribed line of travel relative to said holder;
- a transducer head assembly including a movable head for repetitively traversing a record positioned in said holder;
- means fixedly mounting said holder and transducer assembly in a relative position for said movable head to traverse a record positioned in said holder along a line transverse to said line of travel.

19. A record machine as set forth in claim 18, wherein said record holder has two side walls and an end wall, said three walls constituting said locating means, and said record holder has an opening along its other end, said line of travel extending through said opening in said other end.

References Cited by the Examiner

UNITED STATES PATENTS

| | | | |
|---|---|---|---|
| 2,245,286 | 6/41 | Marzocchi | 179—100.2 |
| 2,915,596 | 12/59 | Lyon et al. | 179—100.2 |
| 2,998,494 | 8/61 | Nations | 179—100.2 |
| 3,050,596 | 8/62 | Whitney et al. | 179—100.2 |

NORTON ANSHER, *Primary Examiner.*

STEPHEN W. CAPELLI, EMIL G. ANDERSON, EVON C. BLUNK, *Examiners.*